(12) United States Patent
Ganser

(10) Patent No.: US 7,986,338 B2
(45) Date of Patent: Jul. 26, 2011

(54) MICROSCOPE SYSTEM AND IMAGE PRODUCTION METHOD

(75) Inventor: Michael Ganser, Giessen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1395 days.

(21) Appl. No.: 11/421,127

(22) Filed: May 31, 2006

(65) Prior Publication Data

US 2006/0291040 A1 Dec. 28, 2006

(30) Foreign Application Priority Data

May 31, 2005 (DE) .......... 10 2005 024 867

(51) Int. Cl.
H04N 7/18 (2006.01)
G06K 9/00 (2006.01)
(52) U.S. Cl. .......... 348/79; 382/133
(58) Field of Classification Search .......... 348/79; 382/133; 359/387; 250/461.1
See application file for complete search history.

(56) References Cited

U.S. PATENT DOCUMENTS

| 5,149,972 A * | 9/1992 | Fay et al. .......... 250/461.1 |
| 5,331,368 A | 7/1994 | Oosawa et al. | |
| 6,191,885 B1 | 2/2001 | Kitagawa | |
| 6,407,768 B1 * | 6/2002 | Ishikawa .......... 348/79 |
| 6,466,690 B2 * | 10/2002 | Bacus et al. .......... 382/133 |
| 6,704,140 B1 * | 3/2004 | Richardson .......... 359/387 |
| 6,907,137 B2 | 6/2005 | Ruehl et al. | |
| 6,917,377 B2 * | 7/2005 | Aizaki et al. .......... 348/79 |
| 2003/0016301 A1 | 1/2003 | Aizaki et al. | |
| 2003/0185450 A1 | 10/2003 | Garakani et al. | |
| 2004/0096095 A1 | 5/2004 | Watkins | |

FOREIGN PATENT DOCUMENTS

| DE | 3503208 | 8/1986 |
| DE | 10031746 | 1/2002 |
| DE | 112004000348 | 4/2006 |
| EP | 1533996 | 5/2005 |
| WO | WO-03078925 | 9/2003 |

* cited by examiner

Primary Examiner — Gims S Philippe
(74) Attorney, Agent, or Firm — Leydig, Voit & Mayer, Ltd.

(57) ABSTRACT

A microscope system and an image production method utilizing a microscope having one or more setting elements for modifying at least one microscope setting, and a camera for acquiring a microscope image, which camera is operable in predeterminable image modes. At least one of the setting elements of the microscope is operatively connected to the camera in such a way that a specific image mode of the camera is settable as a function of a modification of the microscope setting. Alternatively or additionally, a microscope setting can be modified as a function of an image mode of the camera that is present.

21 Claims, 2 Drawing Sheets

MICROSCOPE SYSTEM AND IMAGE PRODUCTION METHOD

CROSS REFERENCE TO RELATED APPLICATIONS

This application claims priority to the German patent application 10 2005 024 867.5, the entire disclosure of which is incorporated by reference herein.

FIELD OF THE INVENTION

The present invention relates to a microscope system, having a microscope that comprises one or more setting elements for modifying at least one microscope setting, and having a camera for acquiring a microscope image, which camera is operable in predeterminable image modes. The invention further relates to a method for image production using a microscope that comprises at least one adjustable microscope setting, and using a camera that is operable in predeterminable image modes; and furthermore to a computer program and a computer program product.

BACKGROUND OF THE INVENTION

Microscope systems of this kind that work with analog video cameras or modern digital cameras, and corresponding image production methods, are known from the existing art. They are used to display high-resolution microscope images or to display, for example, biological processes in real time, or to observe manipulations of various types of specimens. Analog video cameras were and are in principle capable of generating a moving image (usually at a standard of 25 or 30 frames per second), but their resolution is limited (usually 640×480 pixels as standard). Analog video cameras are consequently not suitable for demanding tasks or for documentation purposes. They are equally unsuitable for very low luminance specimens (e.g. in fluorescence investigations), since the predetermined frame rate does not allow long exposure times.

Modern digital cameras for microscopy, on the other hand, generate images of good quality and resolution and moreover allow long exposure times. It is not readily possible, however, to work interactively at the microscope with such cameras. Interactive work at the microscope often involves searching for a specific specimen point, focusing on it, and then possibly performing manipulations or investigations. Because of the large volumes of data for each image, perceptible delays (in the range from 1/10 of a second to several seconds) occur upon readout from the sensor and upon transfer to the processing computer or the screen.

Most of these digital cameras possess a plurality of adjustment capabilities allowing operation in a variety of image modes. For a good image of low luminance specimens, for example, the exposure time must be increased to several seconds; this correspondingly limits the frame rate. It is also possible to shorten the exposure time and correspondingly increase the camera's internal gain. This results, however, in a noisy and unattractive image that can be used for navigation purposes (detail searching) but not for documentation purposes. Another capability is that of selecting different image processing modes. For example, pixel groups can be grouped together or "binned" into pixel groups (e.g. 2×2, 3×3, etc.) when the images are read out. With so-called "subsampling", only every second or third pixel is read out. This yields images that have less detail but are available at a higher frame rate. The camera's internal gain and the above-described image processing modes can also be combined with one another.

To ensure that specimens look as sharp as possible while they are being displaced ("navigation"), the exposure time must be decreased to approximately one to two milliseconds, regardless of the frame repetition rate. This results, even with specimens that are not low-luminance, in a situation like the one already described above: for usable images the internal gain must be raised, but this causes image noise to increase.

Lastly, the images generated in the camera's various image modes generally differ in terms of size (especially if the image modes differ in terms of resolution), and often in terms of brightness and color. This is not a convenient solution for the person viewing the screen.

SUMMARY OF THE INVENTION

It is an object of the present invention to propose a microscope system and an image production method that make possible user-friendly, automatable, and convenient image production in video microscopy, i.e. when a microscope and a camera are used.

A microscope system according to the present invention, having a microscope that comprises one or more setting elements for modifying at least one microscope setting, and having a camera for acquiring a microscope image, which camera is operable in predeterminable image modes, is characterized in that at least one of the setting elements of the microscope is effectively connected to the camera in such a way that a specific image mode of the camera is settable as a function of a modification, i.e. movement or immobility, of a setting element.

Various known microscope settings include the position of a microscope stage, the position or selection of a microscope objective, the location of one or more diaphragms or apertures in the illumination beam path and/or imaging beam path, and the illumination intensity of the specimen. In most microscopes, the aforesaid parameters are adjustable manually or in motorized fashion. For example, the position of the microscope stage in its X-Y plane can be modified in order, for example, to navigate over the specimen in search of details. For focusing, either the position of the microscope stage in the Z direction, or that of the microscope objective, can be modified. A specific microscope objective is selected depending on the specimen and the desired magnification and resolution. Selection of the diaphragms or apertures in the illumination beam path or imaging beam path influences optical imaging properties of the microscope such as resolution, depth of focus, and light intensity. Lastly, the illumination intensity of the specimen also allows the illumination intensity in the image plane to be controlled.

In order to modify the aforesaid microscope settings, corresponding setting elements, which can be operated or activated manually or in motorized fashion, are provided on the microscope. According to the present invention, provision is made for at least one of these setting elements to be effectively connected to the camera in such a way that a specific image mode of the camera is set as a function of a modification of the setting element and thus a modification of the microscope setting. Whereas heretofore an optimum image mode had to be set on the camera during each microscopic investigation, the present invention now makes it possible to set a specific (or the optimum) camera image mode automatically as a function of the selected microscope setting. The invention can be implemented with both analog and digital cameras. More image modes can be implemented in the case of digital cameras.

Alternatively or additionally, in the context of the present invention a setting element of the microscope can be modified as a function of the camera image mode that is present. In this case the aforesaid effective connection between the at least one setting element of the microscope and the camera is configured bidirectionally. In this alternative variant of the invention it is therefore possible, for example, to set a desired image mode on the camera, whereupon a corresponding, in particular maximally optimum, microscope setting is performed by modification of the corresponding setting elements. When the aforesaid variant of the invention is additionally used, it is possible, for example after setting a specific image mode of the camera (following a modification of setting elements of the microscope), to modify certain setting elements of the microscope in turn, for example in order to optimize the image quality of the selected image mode by selecting the optimum illumination.

An image mode is defined by one or more settings on the camera, such as the camera's internal gain, the exposure time, frame sequence rate, image format, image contrast, resolution (number of pixels in the X and Y directions), color distribution (intensity of the individual colors), image brightness, and image processing mode (e.g. binning or subsampling).

Information about the respective microscope settings can be obtained in various ways. It is advantageous if the corresponding setting element comprises a sensor that furnishes a corresponding electrical signal. For the purposes of the present invention, such sensors can be mounted in known fashion on a setting element. Such sensors are often already present, in particular in the case of motor-operated microscopes. In a further advantageous embodiment, the information can be obtained by way of motors that are connected to the setting elements. Such motors are already present in a context of motor-operated microscope settings (e.g. stage position adjustment), and can be used for the purposes of the present invention. It is desirable to transfer the setting values of the corresponding microscope setting outward via an electronic interface.

It is correspondingly desirable if the camera of the microscope system is equipped with an external interface by way of which the typical settings mentioned above, which define an image mode of the camera, are modifiable.

It is advantageous if the microscope setting element that is effectively connected to the camera is connected to the camera via a logic unit. Usefully, specific image modes are predetermined in the logic unit. Depending on the image mode that is selected, the corresponding settings are performed by the logic unit, for example, via the camera's external interface. Selection of the image mode depends in turn on the microscope settings that are modified. For example, different image modes can be initiated respectively for slow modifications of microscope settings (e.g. microscope stage movements, modifications to diaphragms and/or illumination), rapid modifications of such settings, and periods with no modifications to these settings. On the other hand, for example, a movement of the microscope stage in the X-Y plane can result in a different mode than a movement only in the Z direction (for focusing). Selection of the respectively desired image mode as a function of the modifications in microscope settings that are performed is predetermined, and is stored in the logic unit in such a way that the latter automatically performs the necessary evaluations and settings.

It is also advantageous to select a logic unit of this kind for the alternative or additional variant of the invention in which a setting element of the microscope is modifiable as a function of the camera image mode that is present. For example, the logic unit can either retrieve the respective image mode from the camera or, as described above, can stipulate the image mode. As a function of the particular image mode, it may be useful to modify microscope settings or to make further modifications to the microscope settings. For that purpose the logic unit is connected, e.g. via an interface, to the corresponding setting elements of the microscope. In certain image modes of the camera it may be useful, for example, to increase the illumination intensity of the specimen plane. The logic unit can activate the microscope lamp controller for that purpose.

Optimum image quality can be achieved in this fashion, in particular by way of a bidirectional effective connection.

In a particularly preferred and user-friendly embodiment, the microscope system contains a display unit, connected to the camera, that presents to the user a uniform image format for each camera image mode that is set. This image format is defined, for example, in terms of image size and/or image brightness and/or image color selection. An image in a maximally consistent format is thus furnished to a viewer of the screen, regardless of the actual data format of the camera. In cameras known hitherto, when changes are made between different image modes, the data format of the camera then usually also changes. In the case of binning or subsampling, for example, a correspondingly smaller image is furnished, the brightness per pixel additionally being increased in the case of binning. By way of the proposed embodiment, the image format remains substantially unchanged in such cases even in the event of a change in image mode.

It is useful if the aforementioned display unit comprises a graphics processor and a monitor. The graphics processor can, however, also be a constituent of the camera in terms of equipment engineering; the display unit is then made up substantially of a monitor. The graphics processor handles the computing work for converting the actual readout format of the camera sensor into an image having a maximally consistent size, brightness, and color. The scaling factors necessary for this can be obtained by the graphics processor either directly from the logic unit or indirectly via the camera.

A method for image production according to the present invention, using a microscope that comprises at least one adjustable microscope setting and using a camera that is operable in predeterminable image modes, is characterized in that a specific image mode of the camera is automatically set as a function of a modification made to the microscope setting. This method can be carried out using the microscope system according to the present invention, and the reader is referred in that context to the description above of the microscope system according to the present invention.

Be it noted at this juncture that in principle, the information about a modification of the image content (e.g. "moving" or "at rest") can also be obtained from the image itself, with no coupling to the microscope being performed. Because of the large calculation effort in the context of associated image processing, disadvantageous delayed reactions by the system are frequently the consequence in this case.

It is desirable in the context of the method according to the present invention if information about a microscope setting is taken from a sensor and/or a motor, the sensor detecting the respective microscope setting and the motor performing the respective microscope setting. Also useful is the delivery of information about a microscope setting to a logic unit that activates the camera so as to select an image mode. With regard to the aforesaid embodiments and their advantages, the reader is referred to the statements made in conjunction with the microscope system according to the present invention.

It is additionally useful if one or more image modes are predetermined for moving images and for stationary images. As already discussed, it may be useful to allocate two modes for moving images depending on the speed of movement, while working with only one image mode for stationary images. In the stationary case, for example, operation switches after a typical time into a stationary-image mode that operates at a maximum resolution suitable for documentation purposes. A first moving-image mode that operates with short exposure times and high gain can be defined, for example, for navigating over the specimen to be investigated. Lastly, a second moving-image mode can be defined as an intermediate solution (e.g. at 10 images per second) for slower changes in movement, so as to obtain higher-quality images in the context of, for example, slow scanning.

As already stated above, it is particularly preferred if the images furnished by the camera in the various image modes are displayed in a uniform format. In order to avoid repetition, the reader may here be referred once again to the statements made in connection with the microscope system according to the present invention.

Camera settings that are appropriate in terms of application engineering are combined in order to define an image mode. In individual cases, recourse may also be had to image modes predetermined by the camera. An image mode can be predetermined statically, i.e. in unmodifiable fashion. It may also be useful, however, if an image mode is predetermined in modifiable fashion, such that, for example, specific technical camera settings in an image mode can be individually varied by the user. The modifications can then be saved. On the other hand it is also possible, in the context of a modification of an image mode (e.g. an increase in brightness), for corresponding modifications of the other predetermined image modes also to be performed automatically.

The invention further relates to a computer program for implementation of the image production method according to the present invention. The computer program encompasses program code means for carrying out all the steps of a method as described above. The computer program for selecting a specific image mode as a function of the microscope settings that are performed is usefully stored in the aforesaid logic unit or is at least executed there. The computer program performing the conversion of the various readout formats of the camera into uniform (screen) image formats is usefully a constituent of the aforesaid graphics processor.

The computer program product according to the present invention is stored on a computer-readable data medium. Suitable data media are EEPROMs and flash memories, but also CD-ROMs, diskettes, or hard drives. It is also possible to download the computer program via internal networks (intranet) or public networks (Internet).

It is understood that the features recited above and those yet to be explained below in the exemplifying embodiments can be used not only in the respective combination indicated, but also in other combinations or in isolation, without leaving the context of the present invention.

BRIEF DESCRIPTION OF THE DRAWINGS

Further advantages and embodiments of the invention are evident from the description that follows and the attached drawings. The invention and its advantages will now be described in detail with reference to exemplifying embodiments, referring to the drawings.

DETAILED DESCRIPTION OF THE INVENTION

Figure 1:
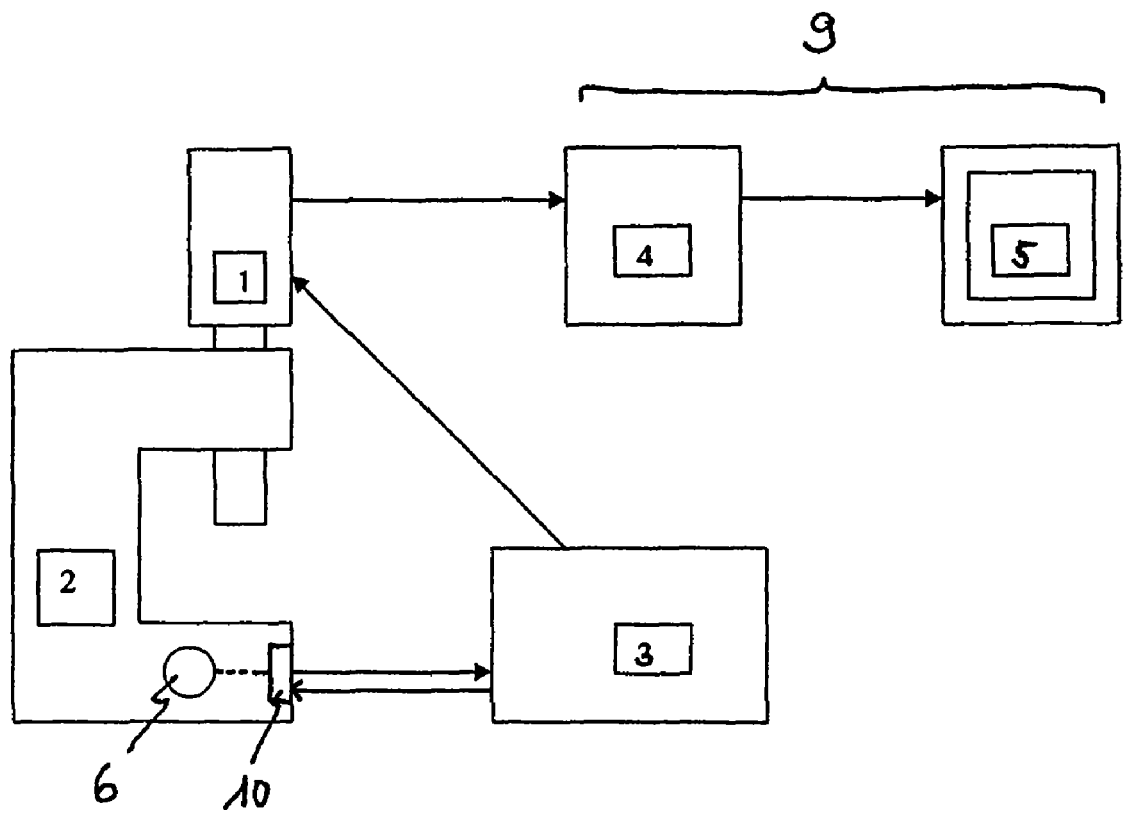
FIG. 1 schematically depicts an embodiment of a microscope system according to the present invention.

An embodiment of a microscope system according to the present invention is schematically depicted in FIG. 1. The microscope is labeled 2. All known microscopes to which a camera can be attached for image acquisition are suitable for the invention. The camera is labeled 1 in FIG. 1. Because video microscope systems of this kind are known per se, a more detailed description is superfluous at this juncture.

According to the present invention, a logic unit 3 is provided which obtains from microscope 2 information about microscope settings that have been performed, and sets the image mode of camera 1 accordingly. Also depicted is a display unit 9, in this exemplifying embodiment made up of a graphics processor 4 and a monitor 5.

Figure 2:
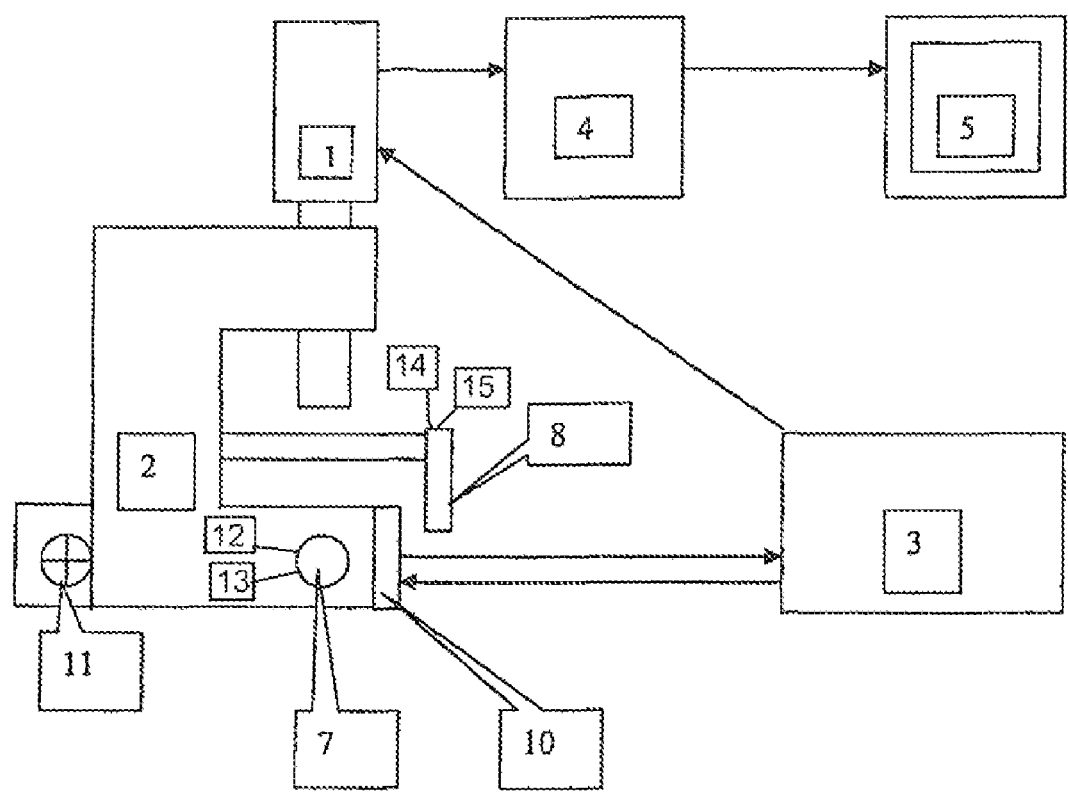
FIG. 2 schematically depicts a further embodiment of a microscope system according to the present invention.

For reasons of clarity, FIG. 1 depicts a single setting element 6 that is connected to an interface 10 inside microscope 2. Actuation of setting element 6 (e.g. displacement of a microscope stage (not depicted) in the Z direction) causes corresponding signals to be transmitted to the interface 10 and to be forwarded from there to the logic unit 3. On the basis of these signals, logic unit 3 can continuously ascertain the current value or the modification of the respective microscope setting; in particular, logic unit 3 can also identify the rate of change in that microscope setting. FIG. 2 shows a more detailed view of the coupling between setting elements 6 on microscope 2 and logic unit 3.

The information about the modification of setting element 6 is processed in logic unit 3, and the image mode matching it is searched for. Selection of the image mode depends in particular on which setting elements 6 on microscope 2 are actuated, and on the speed at which the change in the respective settings occurs. Three image modes, for example, are conceivable and desirable, of which one mode is used for stationary images and the other two modes for moving images. Movements in the microscope stage plane (X-Y plane), as well as modifications to diaphragms and illumination, can initiate one of the moving-image modes. It is desirable in this context to initiate a different moving-image mode in each case depending on the speed of the modification. It may also be desirable to define a further image mode for a motion in the Z direction (focusing).

As a function of the information about modifications of the microscope settings, logic unit 3 selects an image mode accordingly. For that purpose, it is useful for each image mode to be defined in logic unit 3 on the basis of the camera's technical settings. These include exposure time, gain, binning/subsampling, shutter control, and others. The settings of these technical camera parameters define the corresponding image mode at camera 1. For navigation at high speed, short exposure times with high gain are selected.

Example using MT9T01 sensor

| Image modes | Initiated by | Resolution | Frame rate (fps) | Exposure time | Illumination intensity |
|---|---|---|---|---|---|
| 1 ("stationary image") | Immobility | 2048 × 1536 | 10 | 5 ms | Normal |
| 2 ("moving image 1") | Z-drive movement, diaphragm | 1024 × 768 | 27 | 5 ms | Normal |
| 3 ("moving image 2") | X-Y stage movement | 682 × 512 | 60 | 1 ms | Bright |

It is apparent from the table that each camera image mode also contains a setting of the illumination intensity at microscope 2. When a specific image mode is selected as a function of the modifications made to a microscope setting, that mode can therefore in turn modify a setting, in this case the illumination intensity at the microscope. The "bright" illumination is desirable in image mode 3 because of the very short exposure time of camera 1; in the other image modes, such bright illumination is not appropriate for thermal reasons.

For setting the image mode, camera 1 usefully comprises a corresponding interface to logic unit 3. It is additionally desirable to have the above-described allocation of an image mode as a function of the microscope settings performed by a computer program.

Depending on the image mode that has been set, camera 1 then furnishes microscope images in a format typical of the camera. As already mentioned, the camera formats generally differ, in the context of a change in image mode, in terms of image size, image brightness, and/or image color. To allow convenient viewing of the images that are obtained, a display unit 9 is provided which converts the images furnished by the camera into uniform formats. Provided for this purpose, in this exemplifying embodiment, is an image processor or graphics processor (graphics card) 4 that correspondingly post-processes the camera images. The post-processed image can then be displayed on a monitor 5. Be it noted once again in this connection that graphics card 4 can also be a constituent of camera 1. It is also possible, for example, when camera 1 is correspondingly equipped, to perform the post-processing of the images in terms of a uniform format directly in camera 1.

FIG. 2 shows, in a more detailed view than FIG. 1, setting elements 7,8, and 11 of a microscope 2 and their connection to logic unit 3. Elements identical to those in FIG. 1 are assigned the same reference characters in FIG. 2. The configuration and manner of operation of the microscope system depicted in FIG. 2 correspond to those of the system depicted in FIG. 1 . In order to avoid repetition, only the differences with respect to FIG. 1 will be discussed in detail. Focus drive 7 including motor 12 with sensor 13 and stage drive 8 including motor 14 with sensor 15 are depicted, the focus drive resulting in a displacement of the microscope stage in the Z direction, and the stage drive in the horizontal X-Y plane. Lamp 11 denotes the illumination device of microscope 2. The illumination intensity of lamp 11 determines the brightness of the image in the specimen plane and at camera 1. Inside microscope 2, the sensors and actuators (motors) of the microscope are linked electrically and logically (depending on the model or equipment level; not depicted in the drawings).

In this exemplifying embodiment the microscope comprises an electrical interface 10 through which the positions or modifications of the individual microscope settings, in this case the focus and stage drives, can be transmitted outward. Logic unit 3 receives, via this interface 10, the signals regarding the modifications at the sensors of focus drive 7 and of stage drive 8, and decides as to the appropriate image mode. For that purpose, logic unit 3 delivers the corresponding information to camera 1, as already mentioned in connection with FIG. 1. Depending on the image mode that is selected, it may be desirable to modify certain settings on the microscope. In this exemplifying embodiment, logic unit 3 can activate microscope lamp 11 via interface 10 of microscope 2 for this purpose, depending on the image mode selected. In the context of the image modes cited by way of example in conjunction with FIG. 1, if the "stationary image" and "moving image 1" modes were selected, logic unit 3 would not cause any modification to the illumination intensity of lamp 11, whereas if the "moving image 2" mode were selected, it would bring about a higher illumination intensity at microscope lamp 11.

The bidirectional connection between logic unit 3 and microscope 2 is thus particularly suitable for further enhancing image quality for a selected image mode.

The invention makes possible convenient and completely automatable, in particular computer-assisted, video microscopy in which the respectively optimum image mode is ascertained as a function of the nature of the microscopic investigation.

What is claimed is:

1. A microscope system, comprising:
a microscope having at least one setting element configured to modify at least one microscope setting; and
a digital camera configured to acquire a microscope image and being operable in a plurality of predeterminable image modes, wherein the plurality of image modes include a predetermined image mode for stationary images and at least two predetermined image modes for moving images, and
wherein the digital camera and the at least one setting element are operatively connected in a manner such that a specific predeterminable image mode is settable as a function of a modification of the at least one setting element and of a speed of change of the corresponding microscope setting, and wherein illumination settings of the microscope are modifiable as a function of the set image mode of the camera.

2. The microscope system as recited in claim 1, wherein the at least one setting element includes at least one of a sensor and a motor, information about a respective microscope setting being transferable outwardly via the at least one setting element.

3. The microscope system as recited in claim 2, further comprising a logic unit and wherein the at least one setting element is operatively connected to the camera via a logic unit.

4. The microscope system as recited in claim 3, wherein the logic unit defines a type of activation for the camera for at least two image modes, the type of activation being defined based on the information about the respective microscope setting.

5. The microscope system as recited in claim 3, wherein the logic unit defines a plurality of types of activation for the camera, the types of activation being defined based on the respective image mode.

6. The microscope system as recited in claim 5, wherein the image modes contain types of activation for the microscope.

7. The microscope system as recited in claim 1, further comprising a display unit connected to the camera, the display unit presenting to a viewer a uniform image format for each of the plurality of image modes of the camera being set.

8. The microscope system as recited in claim 7, wherein the image format is defined by at least one of an image size an brightness and an image color selection.

9. The microscope system as recited in claim 7, wherein the display unit includes a graphics processor and a monitor.

10. The microscope system as recited in claim 1, wherein the at least one microscope setting is selected from the group consisting of a position of a microscope stage, position of a microscope objective, a selection of a microscope objective, a location of one or more diaphragms in an illumination beam path and/or imaging beam path of the microscope, and an illumination intensity of a specimen.

11. The microscope system as recited in claim 1, wherein the predeterminable image modes are defined by at least one camera setting selected from the group consisting of: camera gain, exposure time, frame sequence rate, image format, image contrast, resolution, color distribution, image brightness, and image processing mode.

12. A method for image production using a microscope having at least one adjustable microscope setting and using a digital camera that is operable in a plurality of predeterminable image modes, wherein the plurality of image modes include a predetermined image mode for stationary images and at least two predetermined image modes for moving images, the method comprising:
  automatically setting one of the plurality of image modes as a function of a modification made to a microscope setting and of the speed of change in the microscope setting, and modifying illumination settings of the microscope as a function of the set image mode of the camera.

13. The method as recited in claim 12, further comprising providing information about the microscope setting using at least one of a sensor and a motor used for modifying the microscope setting.

14. The method as recited in claim 13, further comprising delivering the information to a logic unit, and wherein the logic unit activates the camera so as to select the image mode.

15. The method as recited in claim 12, further comprising displaying images furnished by the camera in the image modes in a uniform format.

16. The method as recited in claim 12, wherein the microscope setting is selected from the group consisting of: a position of a microscope stage, a position of a microscope objective, a selection of a microscope objective, a location of one or more diaphragms in an illumination beam path and/or an imaging beam path, and an illumination intensity of a specimen.

17. The method as recited in claim 12, wherein the plurality of image modes are defined by at least one settings of the camera selected from the group consisting of: camera gain, exposure time, image sequence rate, image format, image contrast, resolution, color distribution, image brightness, and image processing mode.

18. The method as recited in claim 12, wherein an image mode is predetermined in unmodifiable fashion.

19. The method as recited in claim 12, wherein an image mode is predetermined in modifiable fashion.

20. The method as recited in claim 19, further comprising modifying the image mode, and performing corresponding modifications of other image modes.

21. A computer program product having program code means stored on a computer-readable data medium for carrying out a method according to claim 12 when the computer program is executed on a computer.

* * * * *